United States Patent
Eigenberger et al.

(10) Patent No.: US 8,475,754 B2
(45) Date of Patent: Jul. 2, 2013

(54) APPARATUS AND METHOD FOR PURIFYING EXHAUST GASES FOR COMBUSTION ENGINES

(75) Inventors: Gerhart Eigenberger, Neustadt (DE); Ulrich Nieken, Neustadt (DE); Matthias Rink, Reutlingen (DE); Stefan Matschke, Ludwigsburg (DE)

(73) Assignee: Universitaet Stuttgart Institut fuer Chemische, Stuttgart (DE)

( * ) Notice: Subject to any disclaimer, the term of this patent is extended or adjusted under 35 U.S.C. 154(b) by 0 days.

(21) Appl. No.: 13/569,708

(22) Filed: Aug. 8, 2012

(65) Prior Publication Data

US 2013/0136675 A1     May 30, 2013

(30) Foreign Application Priority Data

Aug. 9, 2011 (DE) .................. 10 2011 109 761

(51) Int. Cl.
    *B01D 53/92*     (2006.01)
    *B01D 53/94*     (2006.01)
    *F01N 3/18*     (2006.01)
    *F01N 3/24*     (2006.01)

(52) U.S. Cl.
    USPC .............. 423/213.2; 423/213.5; 423/213.7; 423/DIG. 6; 422/115; 60/288; 60/299; 60/303; 60/320

(58) Field of Classification Search
    USPC ............... 60/288, 303, 320, 299; 423/213.2, 423/213.5, 213.7, DIG. 6; 422/115
    See application file for complete search history.

(56) References Cited

U.S. PATENT DOCUMENTS

| 6,176,082 | B1 | 1/2001 | Shaffer |
| 6,207,116 | B1 | 3/2001 | Heed |
| 6,708,485 | B2 * | 3/2004 | Hinder et al. .............. 60/288 |
| 7,797,928 | B2 | 9/2010 | Friedrich et al. |

FOREIGN PATENT DOCUMENTS

| DE | 195 03 989 A1 | 8/1995 |
| DE | 101 37 050 A1 | 2/2002 |
| DE | 101 05 185 A1 | 8/2002 |
| DE | 102 21 174 A1 | 1/2004 |
| DE | 10 2007 053 130 A1 | 5/2009 |

(Continued)

OTHER PUBLICATIONS

German Search Report Corresponding to DE 10 2011 109 761.2, Feb. 2012.
International Search Report Corresponding to WO2008/072013, Apr. 2008.

*Primary Examiner* — Timothy Vanoy
(74) *Attorney, Agent, or Firm* — Davis & Bujold, PLLC

(57) ABSTRACT

An engine exhaust gas purification device comprising control unit having successively arranged switching device (1), counter-current heat exchanger (3) and at least one exhaust gas purification component (2). The switching device (1) has a first position where a flow path (6) of the exhaust gas to the exhaust gas purification component (2) is opened and a second position where a flow path (6) of the exhaust gas to the exhaust gas purification component (2) is blocked and the exhaust gas flows along a further flow path (7) where the exhaust gas is heated and conveyed, via a flow path (20) of the exhaust gas purification component (2), and exits the exhaust gas purification unit (5) through outlet channels (4) of the counter-current heat exchanger (3). The switching device, the exhaust gas purification component, the counter-current heat exchanger and the flow paths are integrated in a compact exhaust gas treatment unit.

14 Claims, 7 Drawing Sheets

FOREIGN PATENT DOCUMENTS

| | | |
|---|---|---|
| EP | 0 341 832 A3 | 11/1989 |
| EP | 1 625 285 B1 | 11/2008 |
| FR | 2 839 532 A1 | 11/2003 |
| WO | 00/28196 A1 | 5/2000 |
| WO | 2008/072013 A1 | 6/2008 |
| WO | 2009/059679 A1 | 5/2009 |

* cited by examiner

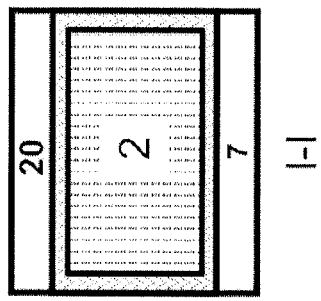
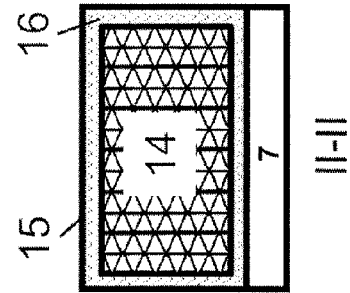
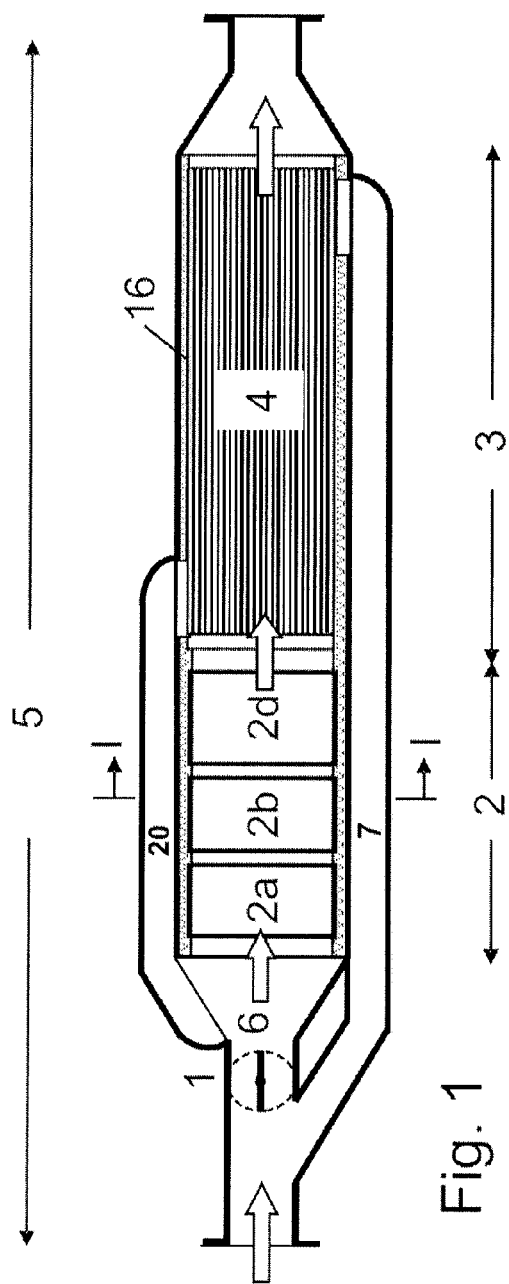
Fig. 1
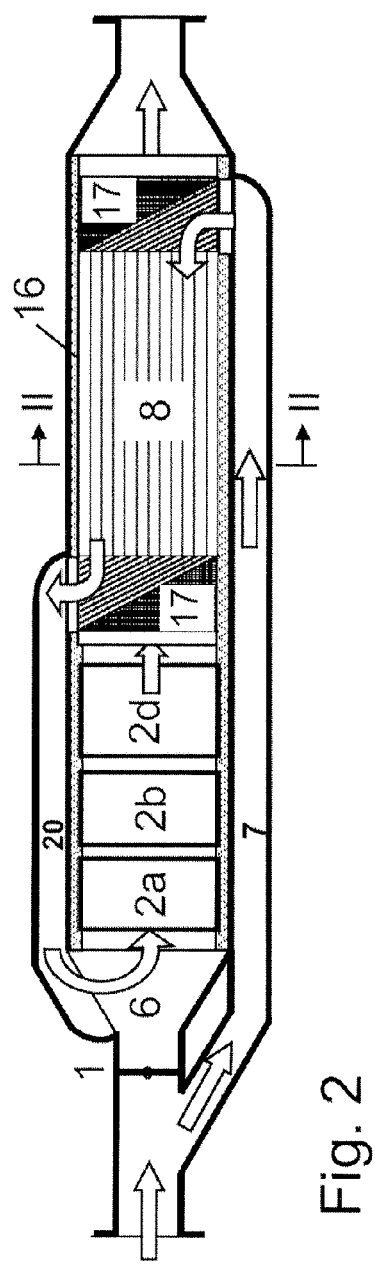
Fig. 2

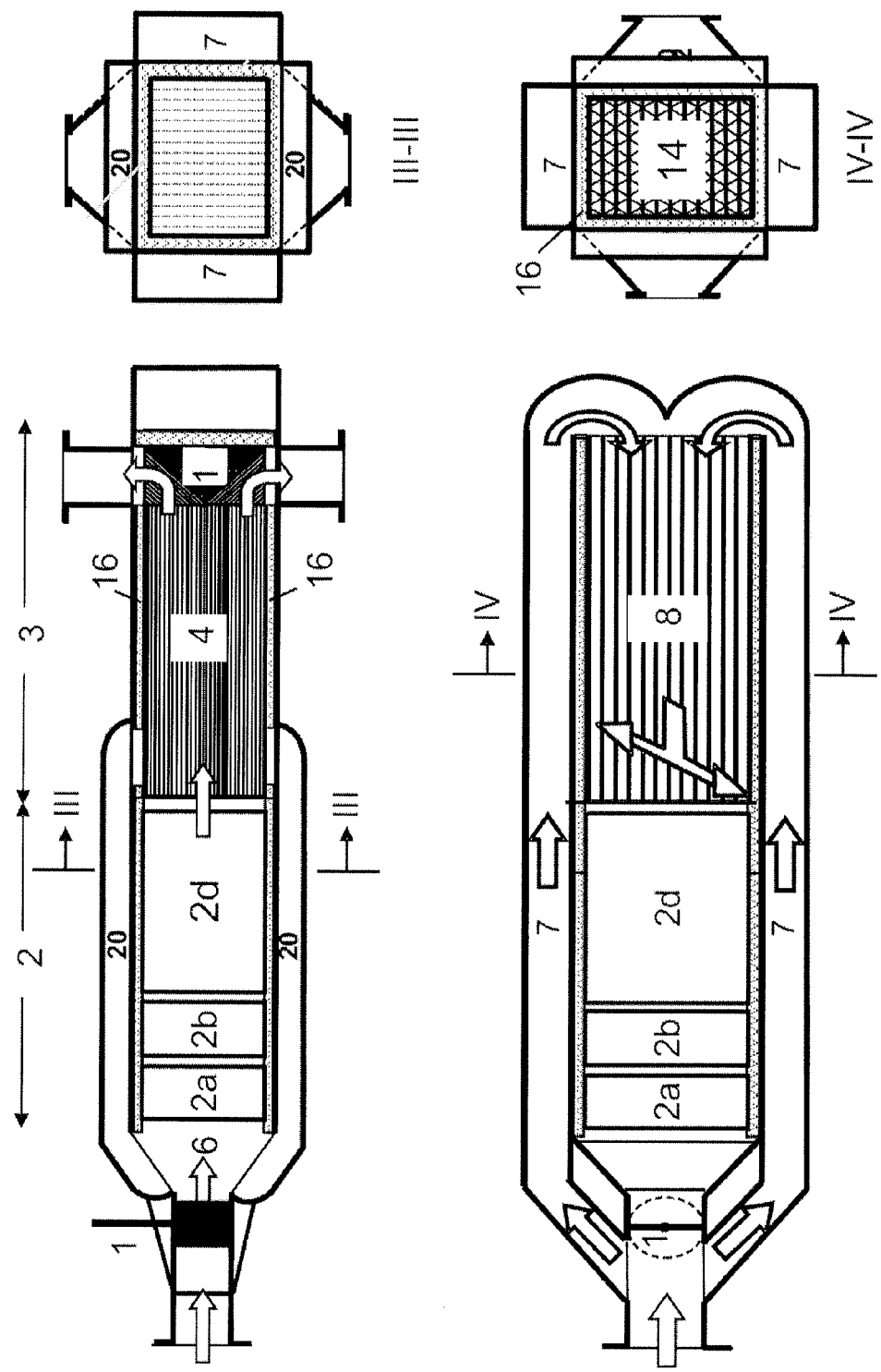

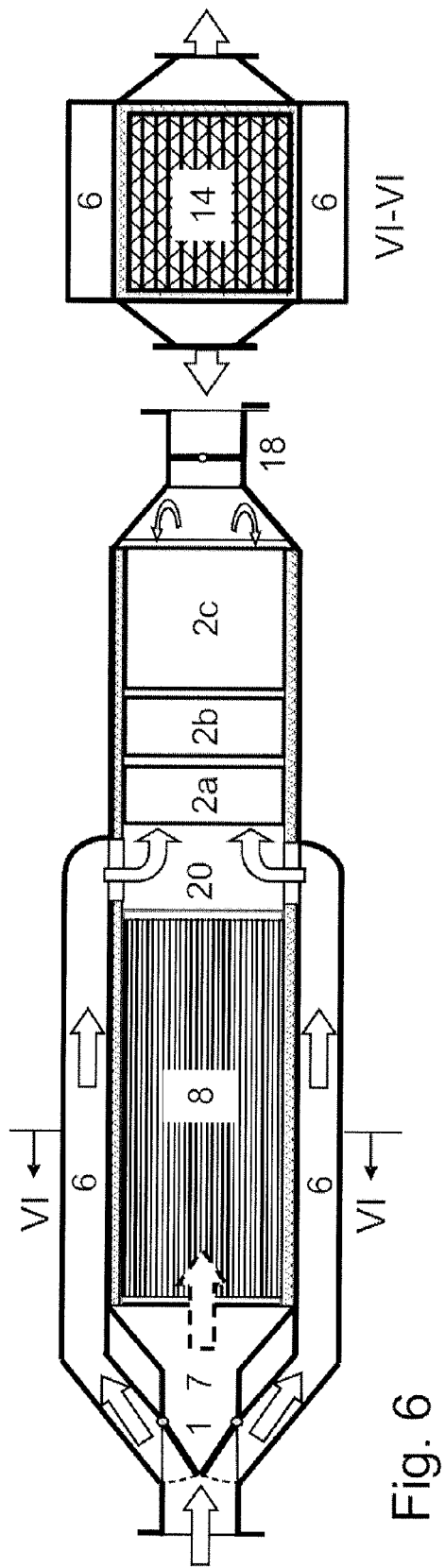
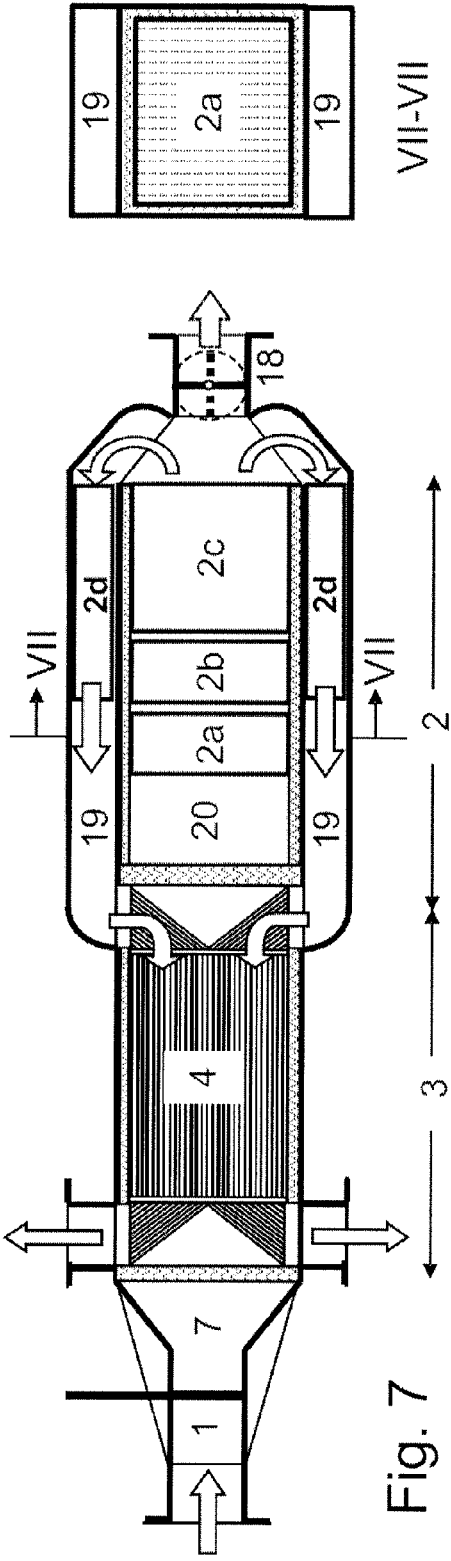
Fig. 6
Fig. 7

APPARATUS AND METHOD FOR PURIFYING EXHAUST GASES FOR COMBUSTION ENGINES

The invention relates to a device for exhaust gas purification for internal combustion engines. The invention further relates to a method for exhaust gas purification for internal combustion engines.

Catalytic exhaust gas purification units for internal combustion engines only operate optimally in a specific range of the engine exhaust gas temperature. When cold starting the engine or at low load, the engine exhaust gas temperature is frequently so low that, in particular with lean-burn internal combustion engines or with natural gas engines, for sufficient pollutant conversion, an excessively high level of precious metals of the exhaust gas catalytic converters is required which is associated with corresponding costs.

According to the prior art which is currently implemented in mass-produced vehicles, the exhaust gas temperatures required for adequate exhaust gas purification are mainly set by means of the electronic engine control unit. This leads to increased fuel consumption when the exhaust gas purification requires raising the exhaust gas temperature. At the same time, the requirements of the exhaust gas purification prevent the engine control unit from being able to be optimized exclusively for an optimal, low consumption operating mode.

Thus so-called heat-integrated exhaust gas purification concepts have been repeatedly proposed in which a separate heat supply in combination with a counter-current heat exchanger are integrated in the exhaust gas system, so that when the exhaust gas temperature is too low the appropriate temperature level is raised by the additional heat supply. Thus, the required heat supply is minimized by a heat exchanger being arranged upstream of the exhaust gas purification components, said heat exchanger transferring the heat of the warmer exhaust gas emerging from the exhaust gas purification unit to the engine exhaust gas. Examples thereof are found in DE 195 03 989 A1 (VW/König), U.S. Pat. No. 6,207,116 B1 (Heed), DE 101 05 185 A1 (Bosch), DE 101 37 050 A1 (Bosch), DE 102 21 174 B4 (Eberspächer), DE 10 2007 053 130 A1 (Daimler) and EP 1 625 285 B1 (UStutt).

Thus, in EP 1 625 285 B1 the object of the invention was to demonstrate a method of how the different exhaust gas treatment steps required for spark-ignition lean-burn engines and diesel engines may be combined in an exhaust gas treatment unit independent of the engine control unit with a catalytic fuel burner and integrated heat exchanger, so that the engine control unit itself is able to optimize the engine operation independently of the exhaust gas post-treatment.

However, none of the aforementioned heat-integrated concepts has hitherto been incorporated in mass-produced vehicles. One reason for this may be cited as the increased cost of equipment, the additional loss of pressure caused by the exhaust gas heat exchanger, the thermal inertia caused by the heat exchanger when cold starting the engine as well as restrictions due to the engine operating conditions which vary very widely.

Instead, the available exhaust gas purification concepts have been further improved, in particular in their cold start behavior, by an arrangement of catalytic converters in the vicinity of the engine, by the further development of catalytic converters and by an engine control unit optimized for exhaust gas purification. However, it is foreseeable that future exhaust gas limit values may only be achieved in this manner by refraining from further optimization of the engine consumption. This applies, in particular, to diesel engines and spark ignition lean-burn engines in which the exhaust gas temperature is generally lower, as well as natural gas engines which require exhaust gas temperatures of/above 400° C. for the combustion of unconverted methane.

In said known concepts of heat-integrated exhaust gas treatment systems, the engine exhaust gas is initially conveyed through the inlet channels of the heat exchanger and then encounters exhaust gas purification units integrated in the heat exchanger or arranged downstream thereof, such as oxidation catalytic converters, particulate filters and DeNOx catalytic converters. The exhaust gas emerging from the exhaust gas purification units then flows through the outlet channels of the heat exchanger and transfers its heat to the intake. This arrangement has the drawback that, when cold starting the engine, the engine exhaust gas slowing heating up initially encounters the cold inlet channels of the heat exchanger, so that the exhaust gas purification units arranged downstream are only heated up in a delayed manner. Thus an additional heat input unit is required, generally in the form of a catalytic or thermal fuel burner, by which the exhaust gas purification units are heated up in a targeted manner.

Drawbacks with these concepts, therefore, are in the additional fuel consumption for rapid heating and in the equipment cost for the burner. Moreover, in high load operation there is the risk that the pollutants which are increasingly released, in combination with the high exhaust gas temperature and the intensifying effect of the heat exchanger, lead to considerable overheating of the exhaust gas purification components and thus to damage thereof or rapid deactivation of the exhaust gas catalytic converters. Additionally, the exhaust gas pressure loss required by the heat exchanger reduces the engine performance, particularly in high load operation.

For example, a very general arrangement has been proposed in WO 2008/072013 A1 of how an exhaust gas purification device may be connected by means of two switch valves to a heat exchanger so that, depending on the position of the valve, the exhaust gas is optionally guided by heat exchange of the intake with the outflow through the heat exchanger and exhaust gas purification unit, or, by bypassing the heat exchanger, only through the exhaust gas purification unit, or additionally it may be guided only through the inlet or outlet channels of the heat exchanger. However, in WO 2008/072013 A1 the heat exchanger and exhaust gas treatment device remain entirely separate and are only connected via pipelines. Additionally, no information is provided about expedient equipment design. Thus, with exhaust gas containing particulates there is the risk that the heat exchanger is gradually clogged by particulate deposits, if it is arranged in the manner shown. In WO 2008/072013 A1, therefore, an arrangement is proposed which by means of two valves permits the hot engine exhaust gas optionally to be conveyed either directly to the exhaust gas purification device or to be additionally guided through a heat exchanger so that the desired heat integration takes place. Nevertheless, the disclosed arrangement requires two switching valves as well as longer pipe sections between the heat exchanger and exhaust gas treatment unit, whereby the volume, the thermal mass and the heat losses are considerably increased.

The object of the invention, therefore, is to develop expedient equipment for exhaust gas purification systems, in which exhaust gas purification components and the heat exchanger are integrated in a compact unit. In this case, the advantages of the proven influence of the exhaust gas temperature and exhaust gas composition are intended to be maintained by means of the engine control unit, so that a relatively rapid cold start behavior results, as in established concepts without heat integration and in the entire operating range of the engine an effective exhaust gas purification is achieved without the overconsumption of fuel, with low pressure loss and with acceptable equipment costs. This is the object of the invention disclosed hereinafter.

According to the invention, this object is achieved by the features set forth in claim 1.

ADVANTAGES OF THE INVENTION

Relative to the prior art hitherto implemented in mass-produced vehicles, the advantage of the invention is that the temperature of the exhaust gas purification components is efficiently set to an optimal temperature level. In the case of an engine exhaust gas temperature which is too low, this temperature level may be maintained with a minimal additional fuel consumption as a result of the efficient heat recovery. The operation of the exhaust gas purification components at an optimal operating temperature permits the precious metal content of the exhaust gas catalytic converter to be considerably reduced, so that the additional costs of the heat exchanger may be more than compensated by savings in precious metals.

In the case of diesel exhaust gas purification, the soot burn-off may be carried out exclusively or substantially by the $NO_2$ produced on the diesel oxidation catalytic converter (so-called CRT regeneration), so that a thermal diesel filter regeneration with all the associated problems and drawbacks may be avoided or considerably reduced in frequency.

Relative to the aforementioned, hitherto known heat-integrated concepts, one advantage of the invention is that with a single exhaust gas valve 1 it is possible to switch between a cold start and/or high load operation and normal operation with heat recovery. Possible leakage of the exhaust gas valve in this case has no effect on the purification performance of the exhaust gas treatment but merely on the quality of the heat recovery.

During a cold start, a rapid heating of the catalytic converter components takes place according to the established prior art, by a hot and $CO/H_2$-rich exhaust gas being produced during the cold start phase by means of the engine control unit and said exhaust gas being conveyed directly to the exhaust gas purification components by opening the exhaust gas valve. In this case, the thermal heating is assisted by the combustion heat released on the catalytic converter. By the temporary diversion of the exhaust gas directly to the exhaust gas purification components, the thermal inertia of the heat exchange is avoided. Thus, at the same time, the requirement of the hitherto known heat-integrated concepts of ensuring rapid heating of the exhaust gas purification components via a (catalytic) fuel burner, is dispensed with.

At the same time, the exhaust gas valve makes it possible to bypass the inlet channels of the heat exchanger, as soon as the exhaust gas has reached the required optimal temperature level at corresponding load. Thus, the temperature of the exhaust gas purification components is prevented from rising to inadmissibly high levels as a result of the heat recovery. At the same time, the pressure loss of the multiple flow deflections is eliminated, which otherwise would have an effect of reducing performance with high exhaust gas flows. Nevertheless, in the embodiments of FIGS. 1 to 5, the exhaust gas still flows through the streamlined outlet channels of the heat exchanger, so that by closing the valve 1, simple switching to operation using the heat exchanger is possible as soon as the exhaust gas temperature reduces again.

In the case of exhaust gas loaded with particulates, specifically diesel exhaust gas, the flow guide of the embodiment according to FIGS. 6 and 7, even in operation with heat exchange, makes it possible to convey the particulate-laden exhaust gas on a very direct path to the exhaust gas purification components and to minimize the risk of the deposit of diesel soot in deflected portions or in the heat exchanger. By means of a further exhaust gas valve 18, during a cold start and in the case of high load with a correspondingly high engine exhaust gas temperature, a large proportion of the exhaust gas may be discharged directly after flowing through the exhaust gas purification components, so that the pressure loss is minimized. In particular, the exhaust gas valve 18 also permits a thermal filter regeneration without the current temperatures being able to damage a DeNOx unit arranged downstream. Finally, the design according to the invention of the equipment of the exhaust gas treatment unit, makes it possible to use exhaust gas purification components in their hitherto technically available and tested form and to connect said components to an efficient and streamlined heat exchanger-channel assembly to form a compact common unit. This avoids, in particular, additional development operations, for the purpose of integrating exhaust gas purification components in the channels of the heat exchanger.

In an advantageous development of the invention, it may be provided that an electrically heatable inert or catalytically coated component is arranged in the region of the inlet of the exhaust gas, by which during the cold start phase heat is able to be introduced into the exhaust gas until the light-off temperature required for the combustion of exhaust gas pollutants in the at least one downstream exhaust gas purification component is exceeded.

Moreover, it may be provided that at least one diesel oxidation catalytic converter and one diesel particulate filter are present as exhaust gas purification components, wherein the counter-current heat exchanger is arranged in the direction of flow upstream of the exhaust gas purification components such that exhaust gas may flow through its inlet channels without flow deflection and with a streamlined inlet and/or outlet, and such that the switching device guides the exhaust gas via a flow path directly to the exhaust gas purification components, in order to bypass the inlet channels of the counter-current heat exchanger. This solution is advantageous, in particular, for diesel engines.

In order to remove nitrogen from the exhaust gases, it may also be provided that one or more nitrogen-removing components are provided as further exhaust gas purification components.

In this connection, an advantageous development of the invention may be that a nitrogen-removing component is arranged in a flow channel arranged downstream of the diesel oxidation catalytic converter and the diesel particulate filter.

If a further switching device is provided downstream of the diesel particulate filter, which may be opened such that the exhaust gas no longer has to flow through the flow path and the outlet channels of the heat exchanger, but leaves the exhaust gas treatment unit directly, during the thermal filter regeneration or in the case of high load, an overheating of components arranged downstream may be prevented in this manner.

A very advantageous embodiment of the invention in terms of structural design may be that the counter-current heat exchanger is formed from a channel assembly with a rectangular cross section, in which inlet channels and outlet channels in each case are arranged alternately adjacent to and/or above one another, and the inflow and/or outflow for each channel direction takes place either axially via the front face or via lateral inlets and/or outlets, and wherein the flow guide and the heat transfer is improved by profiling the walls of the inlet channels and outlet channels or by inserted profiled spacer structures, and wherein the channel assembly is enclosed on the periphery by a common insulating and sealing layer as well as a common casing, so that only inlet and outlet openings for the flow channels remain open and wherein the walls of adjacent flow channels of the channel assembly are guided to inlet and/or outlet openings, in each case in pairs, so that sharp, streamlined inlets and/or outlets are produced.

A compact shape and a reliable mode of operation of the device according to the invention results when the at least one exhaust gas purification component and the channel assembly of the counter-current heat exchanger are arranged in succession and enclosed by insulating and sealing material as well as by a common casing and one or more flow channels extend from the inlet of the exhaust gas purification unit to the intake of the inlet channels of the counter-current heat exchanger, and one or more flow channels extend from the outlet of the inlet channels of the counter-current heat exchanger at the start of the exhaust gas purification components, so that when the exhaust gas switching device is closed, the exhaust gas is guided via the flow channel to the inlet channels of the heat exchanger, is heated therein by the exhaust gas in the outlet channels, is guided via the flow channel to the exhaust gas purification components and leaves said exhaust gas purification components via the outlet channels of the heat exchanger. This includes the assumption that the at least one exhaust gas purification component and the channel assembly of the counter-current heat exchanger are arranged in succession, and an arrangement in which the heat exchanger is arranged in the direction of flow upstream or downstream of the exhaust gas purification components. A particularly compact design results if at least one portion of the flow channels is integrated in the casing such that said flow channels extend along the casing between the respective inlet/outlet openings.

It may also be advantageous if the inlet channels or the outlet channels of the counter-current heat exchanger are guided in a linear manner and without deflections through the heat exchanger. As a result, pressure loss and potential particulate deposits are minimized in these channels. A solution of the object according to the method is revealed from the features of claim 11.

By this method the device according to the invention may be used particularly advantageously for exhaust gas purification.

If it is provided that the direct flow path to the at least one exhaust gas purification component through the control unit and the switching device, after heating the at least one exhaust gas purification component to operating temperature, is opened again as soon as the temperature of the exhaust gas emerging from the internal combustion engine exceeds a threshold value, which does not require heat recovery by the counter-current heat exchanger, potential flow losses are prevented and overheating of the entire device avoided.

In order to purify, in particular, exhaust gases from diesel engines, it may be provided that a diesel oxidation catalytic converter and a diesel particulate filter as exhaust gas purification components are arranged in succession or integrated within one another, wherein the engine control unit ensures by retarded injection or post-injection that the exhaust gas purification components are operated in a temperature range of between ca. 300 and 450° C., so that the regeneration of the diesel particulate filter takes place at least substantially continuously by means of the $NO_2$ formed on the diesel oxidation catalytic converter.

If it is further provided that a switching device arranged downstream of the diesel particulate filter is opened in the high load range of the internal combustion engine sufficiently far that exhaust gas only flows through the outlet channels of the counter-current heat exchanger slightly, and during the thermal regeneration of the diesel particulate filter is fully opened as soon as and as long as exhaust gas emerging from the diesel particulate filter reaches temperature values which may lead to damage of the at least one purification component arranged in the flow channel or of the outlet channels of the heat exchanger, the pressure loss in the corresponding operating ranges is thus minimized and damage to the device according to the invention avoided.

Classification and Description of the Inventive Idea

The drawbacks of the prior art set forth above are avoided by the features set forth in the claims, as follows: according to FIGS. 1 to 7, during a cold start the engine exhaust gas as in conventional concepts is directly conveyed to the exhaust gas purification components 2 arranged in succession, such as for example catalytic converters, particulate filters or the like. In this case, by means of the engine control unit the temperature range required for exhaust gas purification is rapidly reached. The exhaust gas emerging from the exhaust gas purification component 2c/d which is positioned last in the direction of flow, is then conveyed in the outlet channels 4 of a counter-current heat exchanger 3 designed to have low pressure loss, and then leaves the exhaust gas treatment unit 5.

As soon as the exhaust gas purification components 2 have reached the temperature range required for pollutant conversion, and the outlet channel 4 of the heat exchanger is also heated over approximately half the length, by means of a control unit (not shown) the direct flow path 6 of the exhaust gas to the exhaust gas purification components 2 is closed by a switching device 1 and the exhaust gas according to FIGS. 2, 4 and 6 conveyed via a flow path 7 denoted as a bypass, to the inlet channels 8 of the counter-current heat exchanger 3. Here it is heated by the already preheated walls of the outlet channels 4 and, via a further flow path 20 also denoted as a bypass, passes into the direct flow path 6 downstream of the switching device 1. From here it flows as at the start via the exhaust gas purification components 2 and through the outlet channels 4 of the counter-current heat exchanger 3 out of the exhaust gas purification unit 5. In this case it transfers its heat to the exhaust gas flowing in. As a result of the heat recovery, hereinafter the engine exhaust gas temperature and the pollutant content of the exhaust gas may be reduced by the engine control unit to a sufficient extent that the release of heat into the exhaust gas purification components 2 directly compensates for the heat losses of the exhaust gas purification unit 5.

If, after the cold start is complete and due to increased engine load, the engine exhaust gas temperature reaches or exceeds the operating range appropriate for operating the exhaust gas purification components, heat recovery is no longer required by means of the counter-current heat exchanger. Then the switching device 1 may be reopened and the exhaust gas flows on a direct path 6 and with minimal pressure loss through the exhaust gas purification components 2 and the outlet channels 4 of the heat exchanger 3. In this case, the heat exchanger remains at a sufficiently high temperature so that with a further reduction of the engine exhaust gas temperature and the closing of the exhaust gas switching device 1 it is directly able to adopt its heat recovery function again.

The basic principle of the invention outlined above and several expedient embodiments are shown and explained hereinafter with reference to the drawings, in which:

FIGS. 1 and 2 show a first embodiment of the exhaust gas treatment unit 5 according to the invention and the exhaust gas flow guide.

In FIG. 1 the flow path is shown in the case of a cold start or if the engine exhaust gas temperature reaches or exceeds the required operating temperature of the exhaust gas components. In FIG. 2 the exhaust gas flow path is shown with heat recovery through the heat exchanger 3.

FIGS. 3, 4 and 5 show a second embodiment of the invention suitable in particular for large internal combustion engines without particulate filters, with bypasses arranged in pairs in plan view, side view and cross section. FIG. 3 shows the flow guide by bypassing the heat exchanger, in FIGS. 4 and 5 exhaust gas flows through the heat exchanger as intended.

FIGS. 6 and 7 show a third embodiment particularly suitable for internal combustion engines with a particulate filter, also with bypasses arranged in pairs in side view, plan view and cross section.

Figure 8:
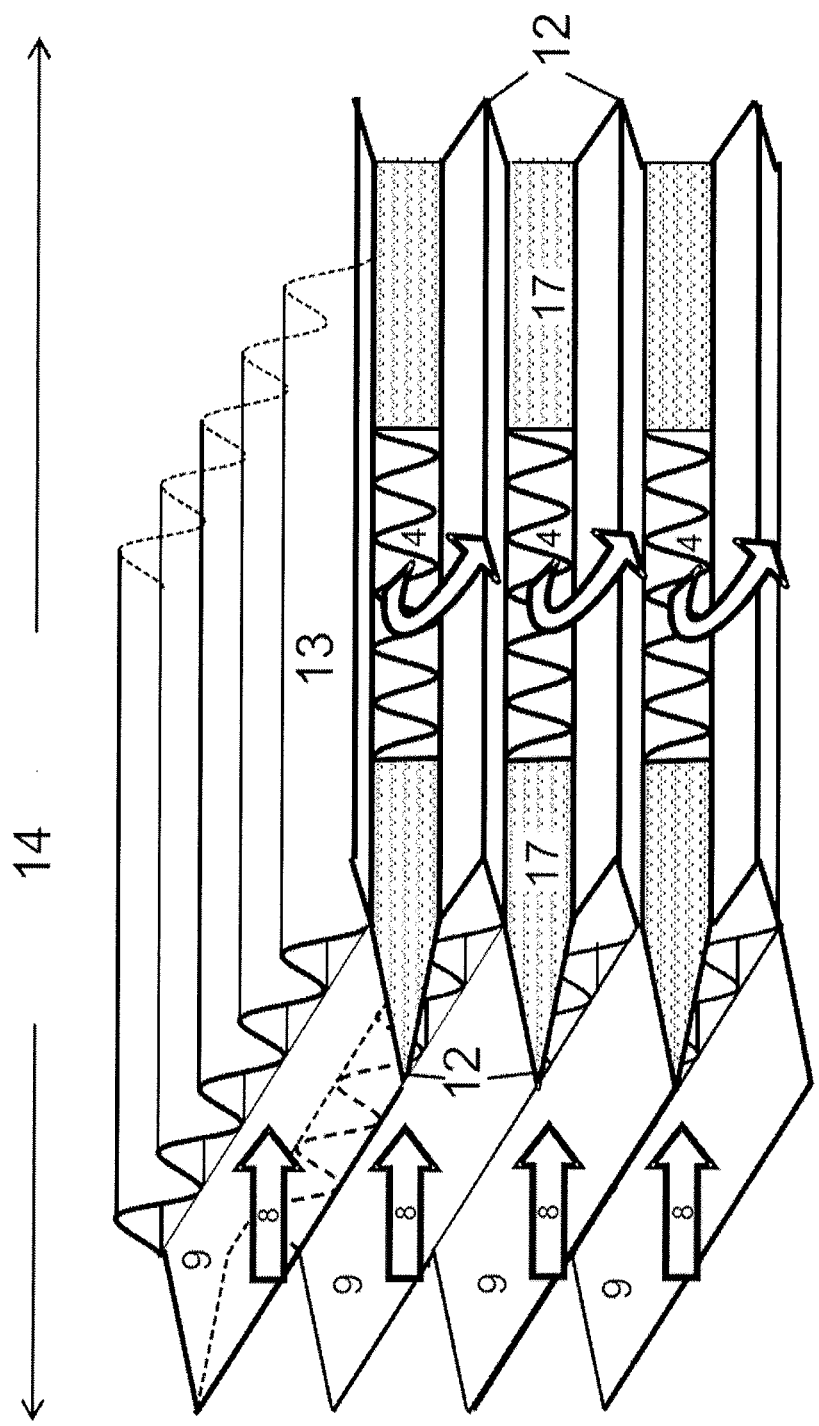
Figure 11:
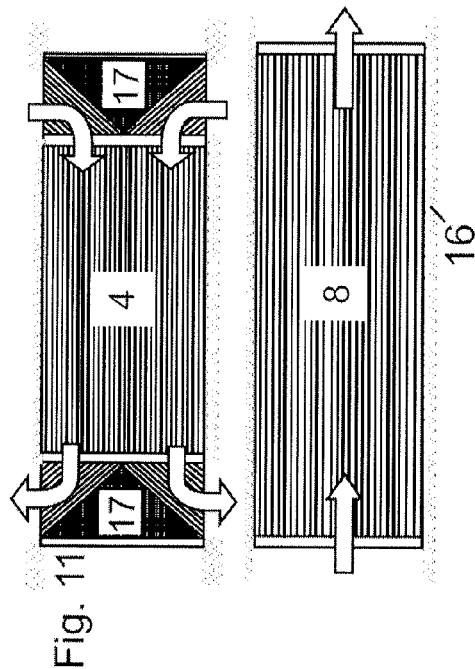
Figure 12:
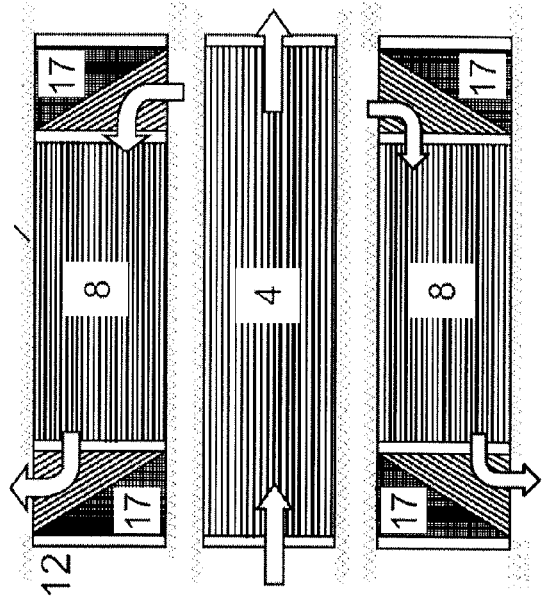

FIG. 8 shows a detail of the channel assembly 14 of the counter-current heat exchanger 3 in a preferred embodiment consisting of a sequence of smooth partitions 9 and wave-shaped spacers 13 in which the smooth walls 9 in each case are combined in pairs at the inlets and outlets so that sharp, streamlined inlets/outlets 12 are produced.

Figure 9:
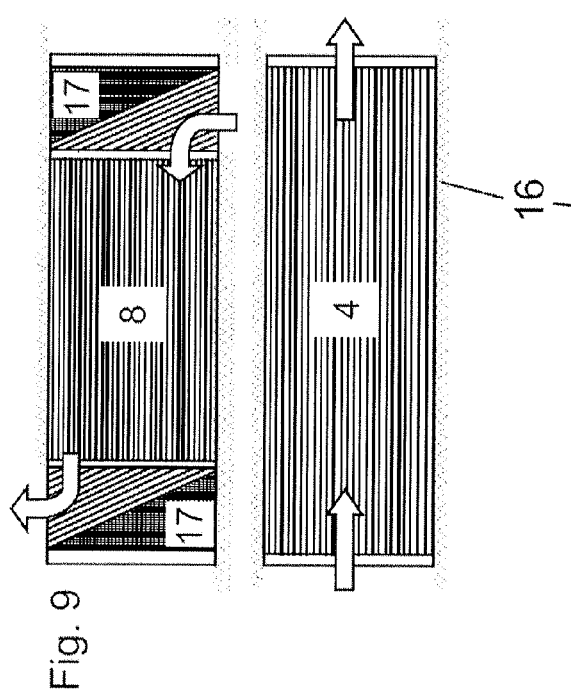
Figure 10:
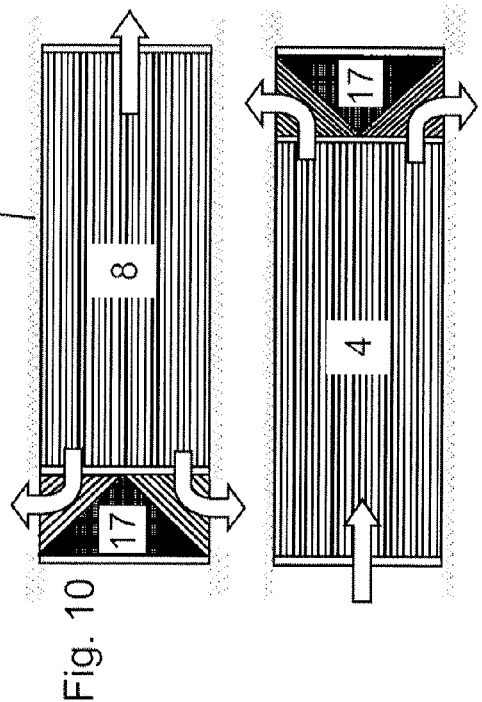

FIGS. 9 to 12 show the flow guide in successive outlet and inlet channels 4, 8 which is effected by the corresponding arrangement of wave-shaped spacers 13 and sealing material 17 between the smooth partitions 9. FIG. 9 shows the flow guide of the arrangement of FIGS. 1 and 2, FIG. 10 shows the flow guide of the arrangement according to FIGS. 3 to 5 and FIGS. 11 and 12 show two alternative flow guides for the arrangement according to FIGS. 6 and 7.

Figure 13:
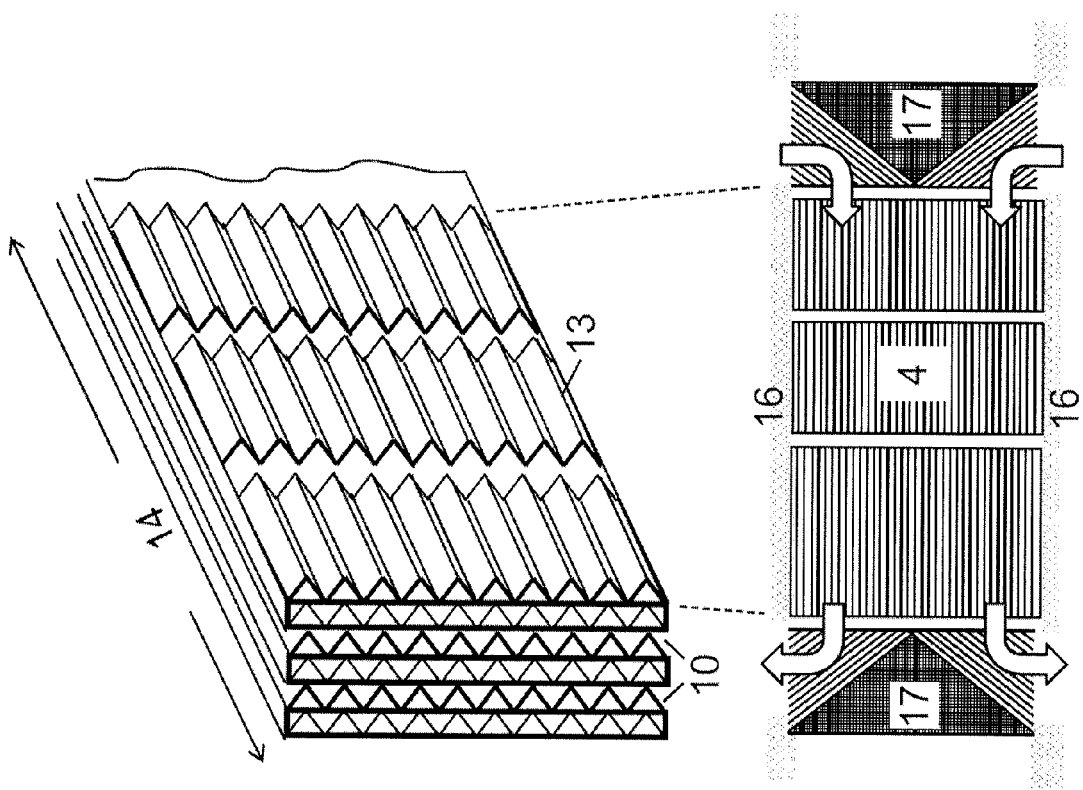

FIG. 13 shows a detail of a channel assembly 14 with the arrangements according to the invention of wave-shaped spacers 13 in the flow channels 4, 8 of the heat exchanger 3, so that after each wave-shaped spacer, the flow may be distributed transversely over the channel cross section.

EMBODIMENT OF THE METHOD ACCORDING TO THE INVENTION FOR ENGINES WITHOUT A PARTICULATE FILTER

The principle idea of the invention according to FIG. 1 has already been described above in brief. It is to be described in more detail below. To this end, FIGS. 1 and 2 show a first embodiment according to the invention in longitudinal and cross sections. The exhaust gas emerging from an internal combustion engine, not shown, or an exhaust gas turbocharger arranged downstream thereof, enters the exhaust gas purification unit 5 via the left-hand pipe connector. The flow guide during a cold start or at high load is shown by the arrows in FIG. 1. In this case, the switching device and/or exhaust gas switching device 1 in the form of a valve is opened, so that the exhaust gas is supplied on the direct flow path 6 to the exhaust gas purification components 2a to 2d arranged in succession. After the last exhaust gas purification component 2d, the exhaust gas leaves the exhaust gas treatment unit on a straight path through the outlet channels 4 of the counter-current heat exchanger 3 via the right-hand outlet pipe connector.

By means of a corresponding engine control unit with retarded ignition, or multiple fuel injection, during the cold start a hot CO— and hydrogen-rich exhaust gas is produced so that the combustion of hydrogen and CO on the oxidation catalytic converter 2a, 2b is rapidly initiated and as a result the exhaust gas quickly heats up the downstream exhaust gas purification components 2 and the outlet channels 4 of the heat exchanger. After successful heating of the exhaust gas purification components 2 and the outflow channels 4, the valve 1 is closed, so that the exhaust gas as shown in FIG. 2 is supplied via the flow path 7 denoted as a bypass channel to the inlet channels 8 of the counter-current heat exchanger 3. In this case, by the already preheated channel walls the exhaust gas is heated to the operating temperature of the exhaust gas treatment components 2 and, via the flow path 20 denoted as the bypass, guided to the intake 6 of the exhaust gas treatment components.

For heating the exhaust gas purification components 2 to their required operating temperature, the engine control unit of the internal combustion engine initially has to produce a correspondingly hot exhaust gas. Additionally, the heating may be accelerated by a first exhaust gas treatment unit in the form of an electrically heatable oxidation catalytic converter 2a. In this case it is advantageous if the engine control unit during the cold start phase produces a CO— and hydrogen-rich exhaust gas so that the heating is assisted by the combustion heat released on the catalytic converter.

As soon as the exhaust gas purification components 2 and the outlet channels 8 of the heat exchanger 2 are sufficiently heated, the switching device 1 which is formed as a valve in the present case is able to be slowly or abruptly closed as shown in FIG. 2. Raising the exhaust gas temperature via the engine control unit is now no longer required. Instead, the engine exhaust gas introduced is now sufficiently preheated by the exhaust gas emerging from the exhaust gas purification components 2 in the counter-current heat exchanger 3. In this case, the engine control unit only has to ensure that the exhaust gas purification components 2 do not fall below the required operating temperature in the case of low load or idling. This may take place in the known manner by an adjustment of the ignition point or the fuel injection, whereby the exhaust gas concentration is slightly raised on non-combusted exhaust gas components. These components are catalytically combusted on the first exhaust gas purification components 2a, 2b, whereby the required heat is provided at the hot end of the heat exchanger. In comparison with a conventional exhaust gas purification unit without heat recovery in the counter-current heat exchanger, depending on the degree of efficiency of the heat exchanger, only a small fraction of the fuel quantity otherwise required is necessary therefor.

If the engine exhaust gas temperature during the operation of the vehicle rises to or above the required operating temperature of the exhaust gas purification components 2, the valve 1 is opened again. Then the sufficiently hot exhaust gas again flows according to FIG. 1 directly onto the exhaust gas purification components 2 and then leaves the exhaust gas treatment unit via the outlet channels 4 of the heat exchanger. By this method, firstly inadmissibly high temperatures are prevented from being set in the exhaust gas purification components 2 by the intensifying effect of the heat exchanger 3. Secondly, the exhaust gas pressure loss of the inlet channels 8 and the multiple deflections in the bypasses 7, 20 are eliminated. This is advantageous, in particular in high load operation, with a high exhaust gas mass flow. Thirdly, hot exhaust gas still flows through the outflow channels 4 of the heat exchanger 3, so that operation with heat recovery according to FIG. 2 may be undertaken again directly when the engine exhaust gas temperature falls below the required operating temperature.

Figure 5:
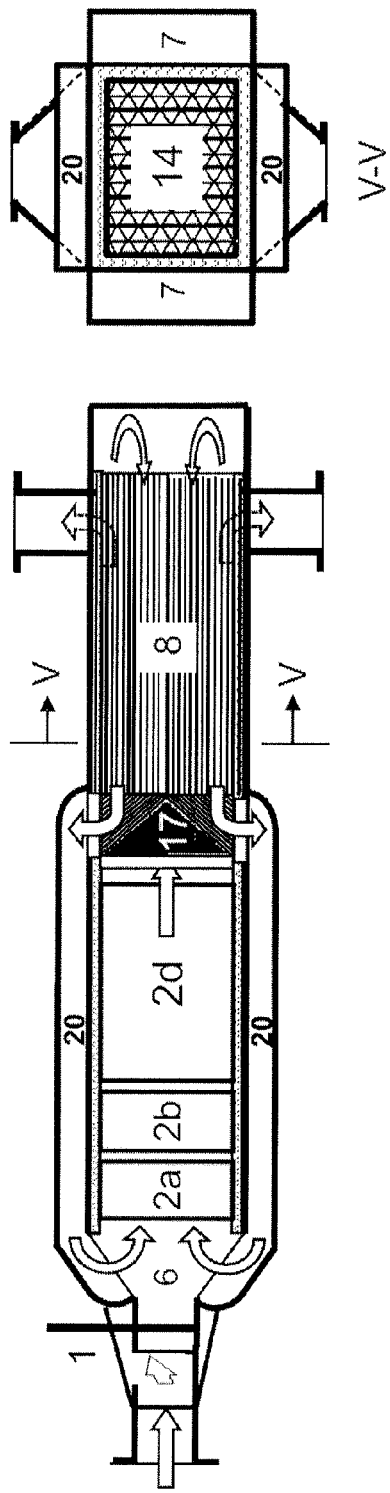

FIGS. 3 to 5 show a further embodiment according to the invention in plan view (FIG. 4), in two side views (FIGS. 3 and 5) and in the respective cross sections. This embodiment differs from the embodiment according to FIGS. 1 and 2 substantially in that the bypasses 7 and 20 in each case are arranged in pairs and symmetrically relative to one another on the four side surfaces of the exhaust gas purification unit 5.

Thus said embodiment is suitable, in particular, for exhaust gas purification of larger engines with a high exhaust gas volumetric flow rate. In contrast to FIG. 2, the intake to the inlet channels 8 and to the outflow channels 4 of the heat exchanger 3 in each case takes place axially and the outflow in each case laterally. It is common to both embodiments of FIGS. 1 and 2 and/or FIGS. 3 to 5 that the switching device 1, the at least one exhaust gas purification component 2, the counter-current heat exchanger 3 and the flow paths 6, 7, 19, 20 are integrated in a compact exhaust gas treatment unit 5.

Embodiment of the Method According to the Invention for Engines with a Particulate Filter FIGS. 6 and 7 show a further embodiment according to the invention in side view (FIG. 6) and in plan view (FIG. 7) together with two cross sections. In the arrangement shown, said embodiment is particularly suitable for exhaust gas purification systems with a particulate filter. In this case, it is preferable if the exhaust gas flow containing particulates flows through the inlet channels 8 of the heat exchanger 3 axially and without deflection in order to avoid substantially a separation and accumulation of particulates in the heat exchanger.

During a cold start and at high load, the exhaust gas flow is conveyed on the flow path 6 directly to the exhaust gas purification components 2 (FIG. 6) with the switching device 1 closed. In the case of the diesel exhaust gas purification, said components comprise a series arrangement of a diesel oxidation catalytic converter DOC 2b, a diesel particulate filter 2c and a DeNOx catalytic converter 2d, wherein the diesel oxidation catalytic converter 2b and/or the DeNOx catalytic converter may also be attached to the particulate filter 2c. As in the previously discussed embodiments, an electrically heatable oxidation catalytic converter 2a may also be arranged upstream of the diesel oxidation catalytic converter 2b. Via the engine control unit and optionally assisted by a post-injection of fuel, the exhaust gas temperature during a cold start is raised sufficiently until the exhaust gas purification components 2 have reached their operating temperature. After leaving the purification components 2, the purified exhaust gas flows over the bypass 19 as in the previously discussed embodiments through the outflow channels 4 of the heat exchanger 3, heats said outflow channels up and leaves the exhaust gas purification unit 5, in this case via the lateral outlet channels.

The switching device 1, designed in this case as a dual valve, is only opened after sufficient heating of the outflow channels 4, and thus at the same time the direct flow path 6 is closed so that the engine exhaust gas now flows axially and without deflection through the inlet channels 8 of the heat exchanger 3 and directly therefrom to the exhaust gas purification components 2 and leaves the exhaust gas purification unit 5 via the bypasses 19 and the outlet channels 4 of the heat exchanger 3 laterally.

As outlined in FIGS. 6 and 7, alternatively a further exhaust gas valve 18 as disclosed above may also be used during a cold start, at high load and in particular with thermal filter regeneration. Then the exhaust gas leaves the exhaust gas treatment unit entirely or partially via the valve 18.

A temperature range of between 300 and 400° C. is provided as a suitable operating temperature window of the exhaust gas purification units 2 for the diesel exhaust gas purification. As the reaction heat released on the exhaust gas purification components 2 is largely recovered by a correspondingly efficient counter-current heat exchanger 3, said temperature level may be maintained without or with minimal excess fuel consumption, even with cooler engine exhaust gas. In this case CO and non-combusted hydrocarbons are oxidized on the oxidation catalytic converter 2a and NO converted to $NO_2$. Then the soot deposited on the downstream particulate filter is continuously burnt off by $NO_2$ (the so-called CRT effect). However, in this case NO is again produced, which in the present case is oxidized on the downstream DeNOx catalytic converter 2d and converted to molecular nitrogen. In this case, both a so-called NOx storage catalytic converter (NSC) with periodic lean/rich exchange or a SCR catalytic converter or a combination of NSC and SCR are considered for the DeNOx method.

As the soot filter regeneration takes place continuously according to the CRT effect, periodic thermal filter burn-off is not necessary. This eliminates the increased fuel consumption required for initiating the thermal regeneration and avoids the risk of high filter burn-off temperatures and damage caused thereby to the exhaust gas purification components arranged downstream of the particulate and/or soot filter. Thus, in this case a NOx storage catalytic converter 2d may also be arranged directly downstream of the particulate filter 2c and not as in FIG. 4 in the bypass channels 19. Then, during the cold start and at high load with a correspondingly high engine exhaust gas temperature, the exhaust gas valve 18 may be opened sufficiently far that only a partial flow of the purified exhaust gas flows over the bypass 19 and the main flow leaves the exhaust gas purification unit 5 via the outlet at 18. As a result, the pressure loss is minimized; at the same time the outlet channels 4 of the heat exchanger 3 are sufficiently preheated so that by closing the exhaust gas valve 18 it is subsequently possible to switch to heat exchanger operation.

If it is not possible or it is not intended to dispense with occasional thermal regeneration, this may take place in the conventional manner by a pollutant-rich exhaust gas being produced by retarded injection or post-injection of fuel, which is combusted on the diesel oxidation catalytic converter 2b and thus produces the exhaust gas temperatures required for thermal filter regeneration upstream of the particulate filter 2c of ~600° C. In this case, the exhaust gas valve 18 should be opened during the filter burn-off in order to avoid an admissible temperature rise as a result of the intensifying effect of the counter-current heat exchanger 3. Moreover, it is advantageous in this case to arrange the DeNOx purification components 2d in the bypass channels 19, in order to avoid thermal damage by burn-off temperatures which are too high. As, in this case, the removal of nitrogen is dispensed with when the exhaust gas valve 18 is open, the engine has to be operated in an operating window with low NOx production, as long as the exhaust gas valve 18 is open.

Electrically Heated Oxidation Catalytic Converter

According to the invention, the heating of the catalytic converter components during a cold start takes place by providing a correspondingly hot and pollutant-rich exhaust gas by means of the engine control unit of the internal combustion engine. The cold start process, however, may be shortened in particular with natural gas engines with a high required operating temperature by an electrically heated oxidation catalytic converter (E-cat) being arranged upstream of the oxidation catalytic converter. In this case, the E-cat is expediently arranged as a first unit 2a of the exhaust gas purification components 2. The E-cat 2a is in this case only electrically heated until the light-off temperature of the pollutant components thereon and on the downstream oxidation catalytic converter is exceeded.

Equipment Design

Within the scope of the invention described above and set forth in the claims, in practice there is a wide variation in the design of the equipment and flow guide. This refers, in particular to a shape which is as compact as possible, extensive use of established exhaust gas purification components and minimizing pressure loss and heat losses. Expedient embodiments according to the invention are described hereinafter.

The counter-current heat exchanger 3 according to the invention preferably comprises a channel assembly 14 with rectangular cross section, as shown in the cross sections of FIGS. 2 and 4 to 6. In this case the inlet channels 8 and the outlet channels 4 are alternately arranged adjacent to and/or above one another, and the inflow and/or outflow for each channel direction 4, 8 takes place either axially via the front face or via lateral inlets and/or outlets. In this case, the heat transfer in the individual channel rows may be improved by profiling the channel walls or by inserted profiled spacer structures 13.

FIG. 8 shows a detail of a channel assembly 14 according to the invention in which the assembly is formed from a series of smooth channel walls 9 and wave-shaped spacer structures 13. In this case, the wave-shaped spacer structures 13 serve firstly for spacing between the smooth channel walls, secondly for the flow guide and thirdly they improve the heat transfer by their ribbed effect. As shown in FIG. 8, in all flow guides it is provided to design the axial inlet and/or outlet by bringing together planar channel walls 9 so that sharp, streamlined inlets and outlets 12 are produced.

FIGS. 9 to 12 show a plurality of advantageous embodiments according to the invention of superimposed inlet and outlet channels, with inserted spacer structures 13. There is great flexibility of design for the spacer structures. Thus the spacer structures 13 formed in a wave-shaped manner shown in FIG. 8, represent structures according to the invention with continuous linear wave peaks and troughs. The direction of the wave peaks and troughs of the inserted wave-shaped spacers is illustrated in all the drawings by shading. FIGS. 9 to 12 show in each case the flow guide for the inlet channels 8 and the outlet channels 4. FIG. 9 shows the flow guide for FIGS. 1 and 2, FIG. 10 the flow guide for FIGS. 3 to 5 and FIGS. 11 and 12 two alternatives for the flow guide in FIGS. 6 and 7. In this case, in FIG. 12 in each case three different flow guides alternate one after the other.

In all flow guides it is provided to design the axial inlet and/or outlet as shown in FIG. 8, by bringing together channel side walls so that sharp, streamlined inlets and outlets 12 are produced.

In order to improve the uniform distribution of the flow via each channel cross section, instead of a continuous wave-shaped structure as in FIG. 5, a plurality of shorter wave-shaped spacers according to the invention are arranged in succession so that between successive wave-shaped spacers the flow is distributed transversely. This is shown schematically in FIG. 13. Alternatively other spacer structures may be used which, by means of openings in the wave-shaped structures or a different shape, permit a transverse exchange within the structure.

In a comparable manner, the uniform distribution of the throughflow of the exhaust gas purification structures 2 may be improved according to the invention by a suitable structure for uniform flow distribution being arranged upstream of the first exhaust gas purification component 2, and/or the oxidation catalytic converter 2b arranged at the inlet being arranged in a plurality of disks located in succession with a small intermediate space.

The channel assembly 14 of the counter-current heat exchanger, as shown in cross section in FIG. 2, is enclosed over the periphery by a common insulating and sealing layer 16 and a common casing 15 which only contain openings for the lateral inlets and/or outlets. In this case, the inflow and outflow openings are sealed relative to the channel assembly 14 by substantially gas-tight insulating material 16 or as also indicated in FIG. 8, by temperature-resistant sealing cords or sealing masses 17.

As is able to be identified from the cross sections of FIGS. 1 to 7, a feature of an advantageous embodiment of the invention is that the exhaust gas purification units 2 and counter-current heat exchanger 3 have approximately the same rectangular cross section so that they are arranged in succession and enclosed by insulating and sealing material 16 as well as a common casing 15. In this case, a further feature of an advantageous embodiment of the invention is that the flow channels 6, 7, 19 and 20 are integrated in the casing so that they extend as in FIGS. 1 to 7 either on in each case one side or in pairs on opposing sides between the respective inlet and outlet openings along the casing.

A further feature of a particularly advantageous embodiment of the invention is that the flow guide of the exhaust gas purification unit is altered by a single exhaust gas switching device 1. As shown in FIGS. 1 to 5, this switching device may be designed in the form of a valve, which opens or blocks access to the direct flow path 6. Alternatively, it may be a dual valve as in FIGS. 6 and 7, which also opens or closes the flow path 6, but in this case at the same time closes or opens access to the inlet channels 8 of the heat exchanger 3.

Additionally, in particular for exhaust gas purification of diesel engines with thermal filter regeneration, a further exhaust gas valve 18 may be present which opens or closes an additional exhaust gas outflow opening downstream of all exhaust gas purification units 2 or upstream of the purification unit for nitrogen oxide conversion 2d. In the last case, it is provided to integrate the purification unit for nitrogen oxide conversion 2d in the bypass channels 19 upstream of the lateral intakes of the outflow channels 4 of the heat exchanger 3.

The invention claimed is:

1. A device for exhaust gas purification for internal combustion engines, the device comprising:
a control unit,
a switching device (1),
a counter-current heat exchanger (3), and
at least one exhaust gas purification component (2),
wherein the switching device (1), the at least one exhaust gas purification component (2) and the counter-current heat exchanger (3) are arranged in succession,
the switching device (1) is continuously or abruptly adjustable between first and second positions, and in the first position of the switching device (1), a flow path (6) of the exhaust gas to the at least one exhaust gas purification component (2) is opened, and in the second position of the switching device (1), a flow path (6) of the exhaust gas to the at least one exhaust gas purification component (2) is blocked so that the exhaust gas flows along a further flow path (7) in inlet channels (8) of the counter-current heat exchanger (3), where the exhaust gas is heated and from where the exhaust gas is conveyed, via a flow path (20) of the at least one exhaust gas purification component (2), and after passing the exhaust gas purification component, exits the exhaust gas purification unit (5) through the outlet channels (4) of the counter-current heat exchanger (3), and
the switching device (1), the at least one exhaust gas purification component (2), the counter-current heat exchanger (3) and the flow paths (6, 7, 19, 20) are all integrated in an exhaust gas treatment unit (5).

2. The device according to claim 1, wherein an electrically heatable inert or catalytically coated component (2a) is arranged in a region of the inlet of the exhaust gas by which during a cold start phase, heat is able to be introduced into the exhaust gas until a light-off temperature required for the combustion of exhaust gas pollutants in the at least one downstream exhaust gas purification component (2) is exceeded.

3. The device according to claim 1, wherein at least one diesel oxidation catalytic converter (2b) and a diesel particulate filter (2c) are present as exhaust gas purification components (2),
the counter-current heat exchanger (3) is arranged in a direction of flow upstream of the exhaust gas purification components (2) such that the exhaust gas may flow through its inlet channels (8) without flow deflection and with a streamlined inlet and/or outlet, and such that the switching device (1) guides the exhaust gas, via a flow path (6) directly to the exhaust gas purification components (2), in order to bypass the inlet channels (8) of the counter-current heat exchanger (3).

4. The device according to claim 3, wherein at least one nitrogen-removing component (2d) is provided as further exhaust gas purification components (2).

5. The device according to claim 4, wherein the at least one nitrogen-removing component (2d) is arranged in a flow channel (19) downstream of the diesel oxidation catalytic converter (2b) and the diesel particulate filter (2c).

6. The device according to claim 3, wherein a further switching device (18) is provided downstream of the particulate filter which may be opened such that the exhaust gas no longer has to flow through the flow path (19) and the outlet channels (4) of the heat exchanger but directly exhausts from the exhaust gas treatment unit.

7. The device according to claims 3, wherein the inlet channels (8) or the outlet channels (4) of the counter-current heat exchanger (3) are guided in a linear manner and without deflection through the counter-current heat exchanger.

8. The device according to claims 1, wherein the counter-current heat exchanger (3) is formed from a channel assembly (14) which has a rectangular cross section, in which inlet channels (8) and outlet channels (4), in each case, are at least one of alternately arranged adjacent to and above one another, and the inflow and/or outflow for each channel direction (4), (8) occurs either axially via the front face or via lateral inlets and/or outlets, and
the flow guide and the heat transfer is improved by profiling the walls of the inlet channels (8) and outlet channels (4) or by inserted profiled spacer structures (13) and the channel assembly (14) is enclosed on the periphery by a common insulating and sealing layer (16, 17) as well as a common casing (15), so that only inlet-outlet openings for the flow channels (4, 8) remain open and the walls (9) of adjacent flow channels (4), (8) of the channel assembly (14) on inlet and/or outlet openings are combined in each case in pairs so that sharp, streamlined inlets and/or outlets (12) are produced.

9. The device according to claim 1, wherein the at least one exhaust gas purification component (2) and the channel assembly (14) of the counter-current heat exchanger (3) are arranged in succession and are enclosed by insulating and sealing material (16, 17) as well as by a common casing (15) and at least one flow channel (7) extends from the inlet of the exhaust gas purification unit to the intake of the inlet channels (8) of the counter-current heat exchanger (2), and at least one flow channel (20) extends from the outlet of the inlet channels (8) of the counter-current heat exchanger (3) at the start of the exhaust gas purification components (2) so that, when the exhaust gas switching device (1) is closed, the exhaust gas is guided via the flow channel (7) to the inlet channels (8) of the heat exchanger (3), is heated therein by the exhaust gas in the outlet channels (4), is guided via the flow channel (20) to the exhaust gas purification components (2) and exits from the exhaust gas purification components via the outlet channels (4) of the heat exchanger (3).

10. The device according to claim 9, wherein at least one portion of the flow channels (6, 7, 19, 20) is integrated in the casing (15) such that the flow channels extend along the casing (15) between the respective inlet/outlet openings.

11. A method of exhaust gas purification for an internal combustion engine by at least one exhaust gas purification unit in which the exhaust gas, exiting the internal combustion engine is introduced, wherein the exhaust gas is guided through at least one exhaust gas purification component (2) and a counter-current heat exchanger (3), during cold start of the internal combustion engine, a control unit adjusts a switching device (1) such that the exhaust gas is conveyed by a direct flow path (6) to the at least one exhaust gas purification component (2), whilst by corresponding control of the internal combustion engine, a rapid heating of the exhaust gas occurs so that the at least one exhaust gas purification component (2) is rapidly heated by the engine exhaust gas and the catalytic combustion of the exhaust gas components contained therein up to operating temperature, the method comprising the steps of:
directly conveying the exhaust gas emerging from the at least one exhaust gas purification component (2) or via a flow path (19), in outflow channels (4) of the counter-current heat exchanger (3), heats the outflow channels and from there exits the exhaust gas purification unit (5),
after the at least one exhaust gas purification component (2) reaches the operating temperature, switching the switching device (1), via the control unit, such that the flow path (6) of the exhaust gas is blocked to the at least one exhaust gas purification component (2) so that the exhaust gas is conveyed along a further flow path (7) into the inlet channels (8) of the counter-current heat exchanger (3), where the exhaust gas is heated and from there the exhaust gas is guided, via a flow path (20) of the at least one exhaust gas purification component (2), and after passing through the exhaust gas purification component, exits the exhaust gas purification unit (5) through the outlet channels (4) of the counter-current heat exchanger (3) and thus transfers heat to the inflowing exhaust gas into the inlet channels (8), and
maintaining a favorable operating temperature range of the at least one exhaust gas purification component (2) by exhaust gas pollutants being converted on the exhaust gas purification components (2) in exothermic reactions.

12. The method according to claim 11, further comprising the step of again opening the direct flow path (6) to the at least one exhaust gas purification component (2), via the control unit, and the switching device (1) after heating the at least one exhaust gas purification component (2) to operating temperature as soon as the temperature of the exhaust gas, emerging from the internal combustion engine, exceeds a threshold value, which does not require heat recovery by the counter-current heat exchanger (3).

13. The method according to claim 11, further comprising the step of one of arranging or integrating within one another a diesel oxidation catalytic converter (2b) and a diesel particulate filter (2c) as exhaust gas purification components (2) in succession,
ensuring, via the engine control unit, by retarded injection or post-injection that the exhaust gas purification components (2) are operated in a temperature range of between ca. 300 and 450° C., so that the regeneration of the diesel particulate filter (2*c*) occurs at least substantially continuously by the $NO_2$ formed on the diesel oxidation catalytic converter (2*b*).

14. The method according to claim 13, further comprising the step of opening a switching device (18), arranged downstream of the diesel particulate filter (2*c*), in a high load range of the internal combustion engine sufficiently far that exhaust gas only flows through the outlet channels (4) of the counter-current heat exchanger (6) slightly, and fully opening, during the thermal regeneration of the diesel particulate filter (2*c*), as soon as and as long as the exhaust gas emerging from the diesel particulate filter (2*c*) has a temperature value which leads to damage of the at least one purification component (2*d*) arranged in the flow channel (19) or of the outlet channels (4) of the heat exchanger.

\* \* \* \* \*